US006836692B2

(12) United States Patent
Leavitt et al.

(10) Patent No.: US 6,836,692 B2
(45) Date of Patent: Dec. 28, 2004

(54) SYSTEM AND METHOD FOR INTELLIGENT LENS TRANSFER

(75) Inventors: Richard W. Leavitt, Jacksonville, FL (US); Welton I. Davis, III, Jacksonville, FL (US); Gregory Scott Duncan, Jacksonville, FL (US); Michael J. Strong, Jacksonville, FL (US); Marinus Franciscus Johannes Evers, Heeze (NL)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 581 days.

(21) Appl. No.: 09/925,389

(22) Filed: Aug. 9, 2001

(65) Prior Publication Data

US 2003/0031540 A1 Feb. 13, 2003

(51) Int. Cl.[7] .............................................. G06F 19/00
(52) U.S. Cl. ......................... 700/112; 700/228; 53/498
(58) Field of Search ........................... 700/95, 108–110, 700/112–116, 213–215, 217–219, 223–226, 228–230; 53/52–54, 493–500; 702/81–84; 29/428–431, 563, 564, 564.1; 414/222.01, 222.02, 222.04, 222.05

(56) References Cited

U.S. PATENT DOCUMENTS

| 4,495,313 A | 1/1985 | Larsen ........................ 523/106 |
| 4,640,489 A | 2/1987 | Larsen ........................ 249/122 |
| 4,680,336 A | 7/1987 | Larsen et al. ................ 524/548 |
| 4,761,069 A | 8/1988 | Truong et al. ........... 351/160 H |
| 4,782,946 A | 11/1988 | Pollak ......................... 206/223 |
| 4,889,664 A | 12/1989 | Kindt-Larsen et al. ....... 264/2.6 |
| 4,961,820 A | 10/1990 | Shinagawa et al. .......... 438/725 |
| 5,039,459 A | 8/1991 | Kindt-Larsen et al. ....... 264/2.6 |
| 5,080,839 A | 1/1992 | Kindt-Larsen .............. 264/2.6 |
| 5,094,609 A | 3/1992 | Kindt-Larsen .............. 425/445 |
| 5,461,570 A | 10/1995 | Wang et al. ................. 700/110 |
| 5,476,111 A | 12/1995 | Andersen et al. .......... 134/58 R |
| 5,490,959 A | 2/1996 | Nunez et al. ................ 264/2.6 |
| 5,528,878 A | 6/1996 | Edwards et al. ............... 53/54 |

(List continued on next page.)

FOREIGN PATENT DOCUMENTS

WO        WO 98/42497 A2        10/1998

OTHER PUBLICATIONS

Australian Patent Office Search Report, dated Mar. 3, 2003, for Singapore Appln. No. SG 200204835–3.

Primary Examiner—Maria N. Von Buhr

(57) ABSTRACT

In a processing facility comprising a plurality processing stations each for automatically conveying products in various stages of production for controlled processing, an intelligent product transfer and conveyance system that enables uninterrupted processing of only products determined as having passed a first inspection process at an upstream processing station. The intelligent product transfer and conveyance system for a processing facility ensures a continuous flow of a plurality of good products at sufficiently high speeds from an inspection process to subsequent stations for subsequent individualized packaging. The processing facility may comprise a contact lens manufacturing line for manufacturing spherical or toric type ophthalmic contact lens products.

52 Claims, 6 Drawing Sheets

U.S. PATENT DOCUMENTS

| | | |
|---|---|---|
| 5,555,504 A | 9/1996 | Lepper et al. .............. 700/115 |
| 5,561,970 A | 10/1996 | Edie et al. .................... 53/473 |
| 5,568,715 A | 10/1996 | Ebel et al. ..................... 53/54 |
| 5,578,331 A | 11/1996 | Martin et al. ................ 425/445 |
| 5,607,642 A | 3/1997 | Lepper et al. ................ 422/62 |
| 5,626,000 A | 5/1997 | Edwards et al. .............. 53/281 |
| 5,640,980 A | 6/1997 | Keene et al. ............. 134/58 R |
| 5,649,410 A | 7/1997 | Martin et al. ................. 53/474 |
| 5,675,962 A | 10/1997 | Martin et al. ................. 53/445 |
| 5,687,541 A | 11/1997 | Martin et al. ................... 53/54 |
| 5,690,866 A | 11/1997 | Andersen et al. ............ 264/2.6 |
| 5,690,973 A | 11/1997 | Kindt-Larsen et al. .. 425/436 R |
| 5,696,686 A | 12/1997 | Sanka et al. ................ 700/110 |
| 5,698,047 A | 12/1997 | Keene et al. ............ 134/22.18 |
| 5,706,634 A | 1/1998 | Edwards et al. ............... 53/473 |
| 5,749,205 A | 5/1998 | Edwards et al. ............... 53/542 |
| 5,762,081 A | 6/1998 | Keene et al. .................. 134/59 |
| 5,844,802 A | 12/1998 | Lepper et al. .............. 700/115 |
| 5,891,371 A * | 4/1999 | Lepper et al. ................ 264/2.1 |
| 6,092,001 A * | 7/2000 | Mizuno et al. ............. 700/116 |
| 6,207,086 B1 | 3/2001 | Schlagel et al. ............. 264/2.6 |
| RE37,432 E * | 11/2001 | Martin et al. ................... 53/54 |
| 6,341,726 B1 * | 1/2002 | Castanedo et al. ..... 235/462.13 |
| 6,446,017 B1 * | 9/2002 | Skidmore .................... 702/81 |
| 6,609,041 B1 * | 8/2003 | Sanka et al. ................ 700/115 |
| 6,622,102 B2 * | 9/2003 | Skidmore .................... 702/84 |

* cited by examiner

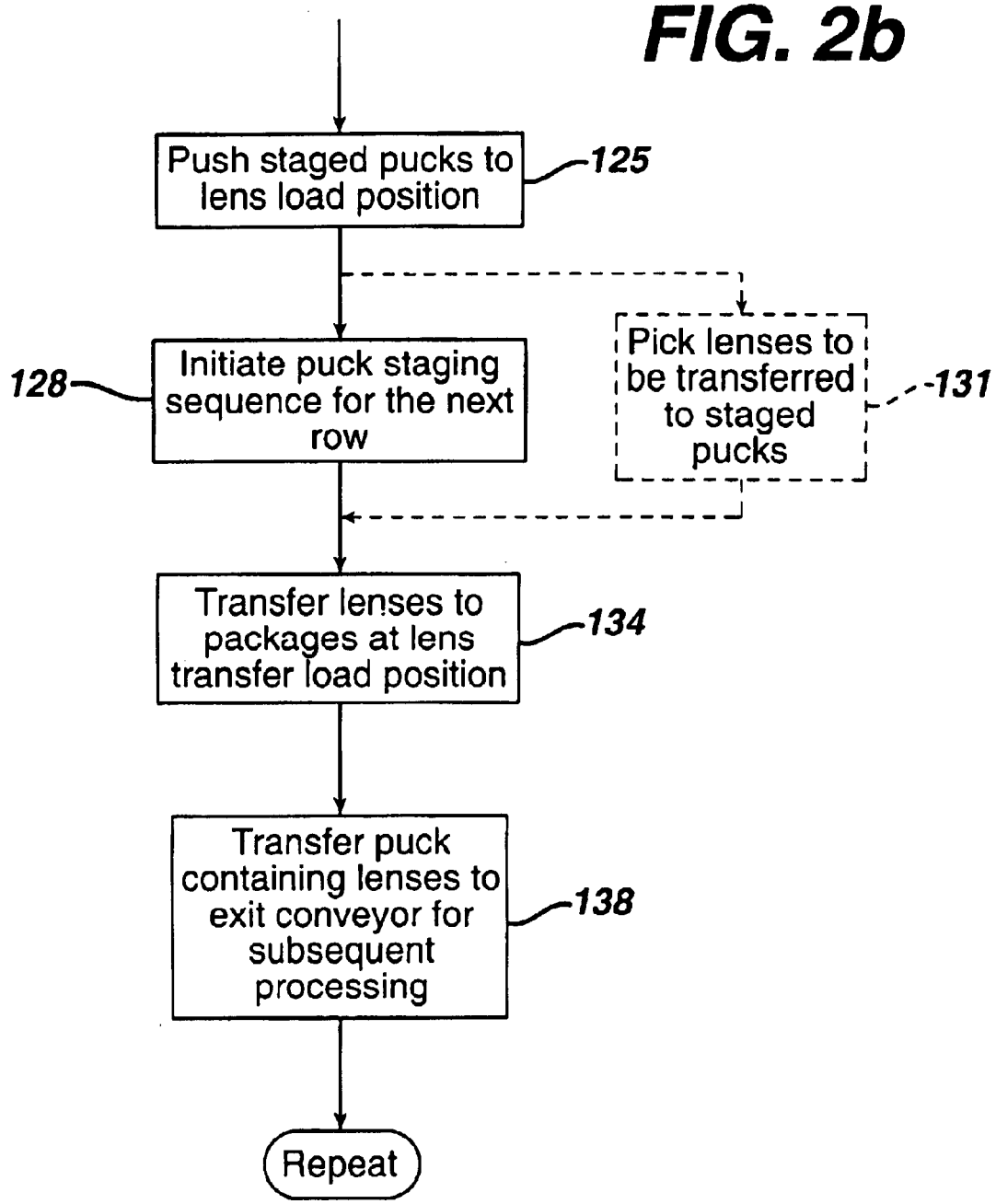

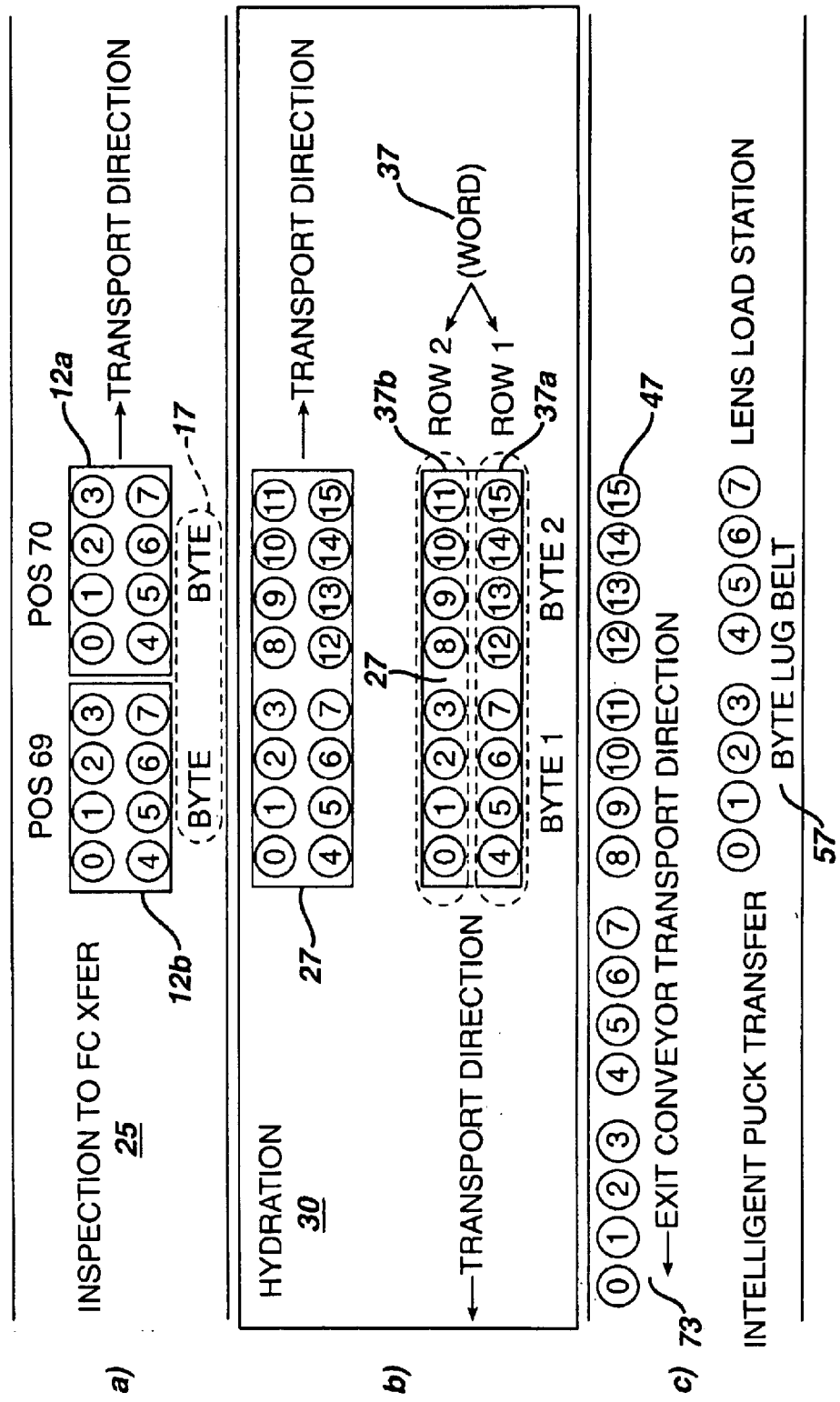

SYSTEM AND METHOD FOR INTELLIGENT LENS TRANSFER

FIELD OF THE INVENTION

The present invention relates generally to a contact lens manufacturing facility for producing ophthalmic contact lenses, and, in particular to a control system and method for transferring formed lenses among one or more processing stations and controlling the automated transfer of individual lenses to individual packages.

DISCUSSION OF THE PRIOR ART

Automated contact lens production processes are known wherein each lens is formed by sandwiching a monomer between back curve (upper) and front curve (lower) mold structure transported in a mold cavity. The monomer is polymerized (cured) to form a lens blank, and is subject to further processing including, but not limited to: removing the lens blanks from their mold structures, i.e., de-molding; subjecting the lenses to a hydration process; transferring of the lenses to an individual blister package; automatic lens inspection of the lens while contained in their blister pack; lens sterilization; and final packaging for consumer use. The reader may refer to issued patents U.S. Pat. No. 5,555,504 entitled PRODUCTION LINE TRACKING AND QUALITY CONTROL SYSTEM and U.S. Pat. No. 5,607,642 entitled INERACTIVE CONTROL SYSTEM FOR PACKAGING CONTROL for a description of an exemplary prior art ophthalmic lens production and packaging control system.

These prior art automatic lens inspection processes provide for automated lens inspection relatively late in the manufacturing process, while the lens has already been "packaged". Needless to say, there is much expenditure of time and resources in the prior de-molding, lens transfer and hydration process for lenses that might eventually be rejected as being defective in any event. Because of this, lens throughput is decreased while processing and material costs may increase, for instance the wastage of packages having defective lenses transferred thereto. Furthermore, the automated process may be subject to additional "down-time" due to increased likelihood of problems that may occur due to processing of defective lenses.

It would be highly desirable to provide for an automated contact lens manufacturing process, a system and method that provides a first level of lens inspection after the de-molding process, to prevent extraneous material handling by enabling only acceptable lenses that have passed inspection proceed to hydration and subsequent to packaging.

Moreover, it would be highly desirable to provide an intelligent lens transfer and conveyance system for a contact lens processing facility that enables uninterrupted processing of only lenses determined as having passed a first inspection process (i.e., "good" lenses).

Moreover, it would be highly desirable to provide an intelligent lens transfer and conveyance system for a contact lens processing facility that ensures a continuous flow of good contact lenses at sufficiently high speeds from a first automatic lens inspection process through to hydration and packaging.

SUMMARY OF THE INVENTION

Accordingly, it is an object of the present invention to provide a control system and method for controlling the automated intelligent transfer of products among a plurality of processing stations in a manufacturing facility, such as for manufacturing ophthalmic contact lenses.

It is a further object of the present invention to provide an automated packaging control system that tracks discrete arrays of products conveyed on a serial flow production line and provides intelligent transfer so that only those products having passed an inspection criteria are packaged.

Another object of the present invention is to provide a control system and method that tracks information relating to a first amount of products conveyed on a first transport structure and tracks the products when transferred to a subsequent transport structures capable of carrying a second amount of products for processing at downstream processing stations.

It is yet a further object of the present invention to provide a control system and method that incorporates a mechanism for removing individual units of an array of products in accordance with the determination of an automated inspection system and causing the removal of rejected lenses, and, further tracking positional status of remaining products having passed inspection that remain in the array as they are conveyed throughout the system for subsequent processing.

It is yet still a further object of the present invention to provide a means for staging packaging materials at a packaging station so that only products determined as passing inspection are packaged irregardless of the random manner in which the products are conveyed to the packaging station due to the removal of individual product units that have failed an acceptance criteria.

Thus, according to the principles of the invention, there is provided for a processing facility comprising a plurality processing stations each for automatically conveying products in various stages of production for controlled processing, an intelligent product transfer and conveyance system that enables uninterrupted processing of only products determined as having passed a first inspection process at an upstream processing station. The intelligent product transfer and conveyance system for a processing facility ensures a continuous flow of a plurality of good products at sufficiently high speeds from an inspection process to subsequent stations for subsequent individualized packaging. The processing facility may comprise a contact lens manufacturing line for manufacturing spherical or toric type ophthalmic contact lens products.

With respect to ophthalmic contact lens production, according to an aspect of the present invention, there is provided a system and method for automatically transporting a plurality of ophthalmic lenses for sequential processing at one or more processing stations, one processing station comprising a mechanism for determining locations of acceptable lenses to be transported for further downstream processing on one or more first transport structures, the method comprising:

a) generating an information record associated with each first transport structure carrying a plurality of lenses, the record including information for identifying the lenses carried by the first transport structure and including a data structure identifying the locations of any acceptable lens carried on the first transport structure as determined at the processing station;

b) conveying the first transport structure carrying zero or more acceptable lenses in sequence to one or more downstream processing stations, and while at each processing station accessing each information record and updating the associated information with status of lenses as a result of processing at the station;

c) communicating an updated information record associated with a first transport structure currently en route to a lens unload area to a transport staging means for staging a plurality of individual transport structures each capable of receiving an individual lens to be transferred from the first transport structure, the staging means responsive to the data structure for aligning a plurality of individual transport structures in a staging area according to locations identified in the data structure as including an acceptable lens; and, d) transferring zero or more acceptable lenses from identified locations in the transport structure at the lens unload area to the staging area and placing a corresponding individual lens to an associated aligned individual transport structure, wherein the updated information record associated with a first transport structure currently en route to the lens unload area is communicated prior to arrival of the first transport structure thereat.

It is an advantage that intelligent lens transfer system and methodology according to the invention decreases expenditures in materials and reduces processing costs by eliminating the packaging of lenses that may eventually be rejected as having failed an acceptance criteria and, vice versa, enabling the transfer of only good products to a packaging location. Moreover, the concept of intelligent lens transfer according to the principles of the invention described herein may be used in a variety of applications and not necessarily for purposes of transferring ophthalmic lens products, but any type of product that are transferred in plural from carriers to individual unit packages.

BRIEF DESCRIPTION OF THE DRAWINGS

Details of the invention disclosed herein shall be described below, with the aid of the figures listed below, in which:

FIGS. 2(a)–2(b) are block diagrams depicting the process 100 for intelligent material handling and lens transfer according to the principles of the invention;

FIGS. 3(a) through 3(c) depict generally the lens pattern information flow in software from the front curve transfer after lens inspection to the intelligent puck staging and lens load station;

DETAILED DESCRIPTION OF THE PREFERRED EMBODIMENTS

Figure 1:
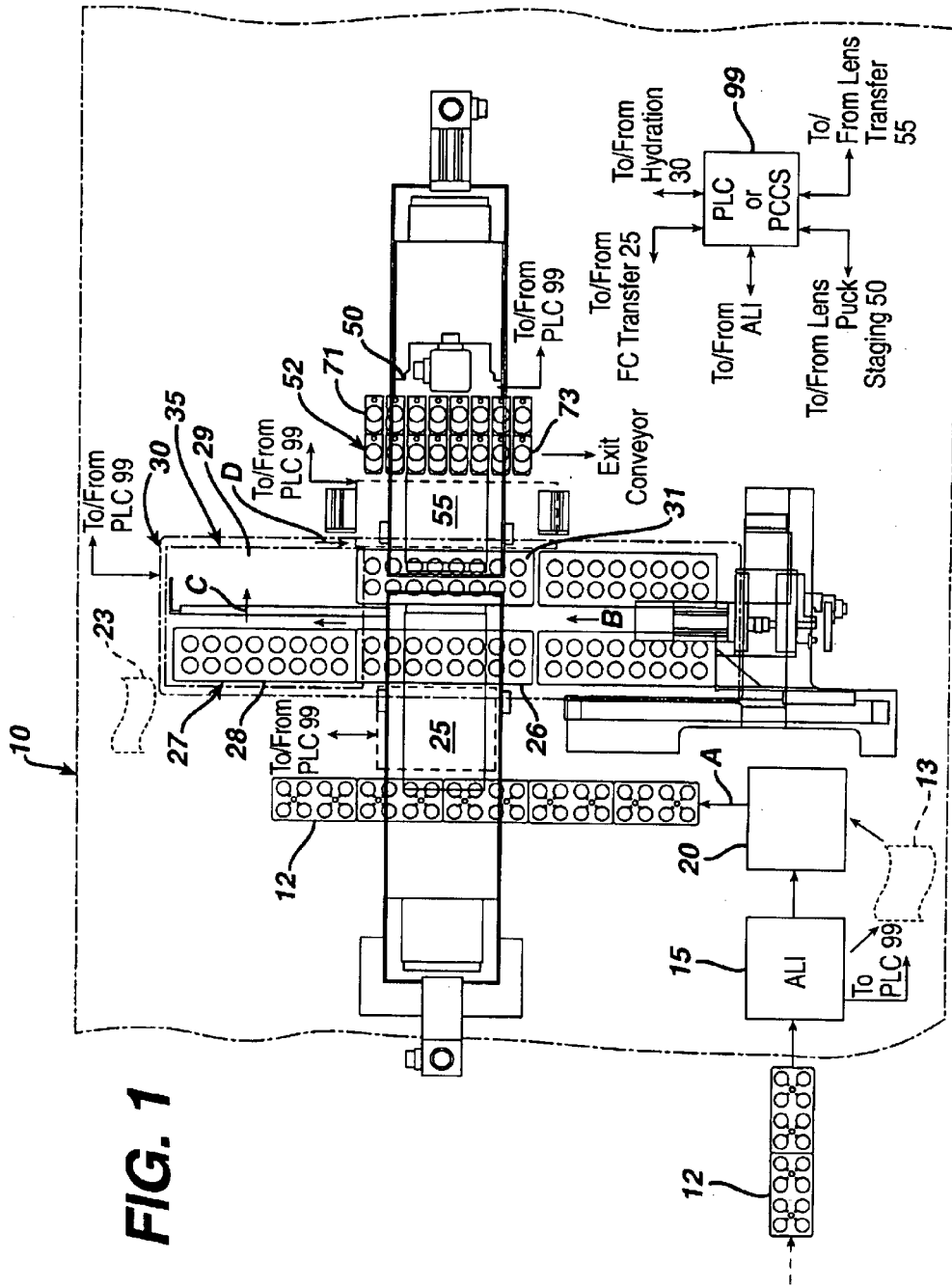
FIG. 1 is a conceptual top plan view of the lens production facility including the various lens production stations involved with intelligent lens transfer according to the invention.

Referring to FIG. 1, there is shown a simplified diagrammatic view of a portion of a contact lens production system 10 including those material handling modules or processing stations designed to enable expedient and consolidated lens hydration and packaging processes. Briefly, as shown in FIG. 1, these stations include: an automatic lens inspection station 15 for receiving a conveyance of transportable structures 12 comprising an array of lens mold cavities having a formed lens blank therein, inspecting the lenses for defects, and generating a pattern of those lenses determined as passing a level of inspection so that only "good" lenses, i.e., those lenses having passed a first level of lens inspection, are subsequently processed; a lens removal station 20 including mechanisms for removing those lenses determined to have failed the lens inspection process; a lens transfer mechanism 25 for transferring each of the lenses from the transportable structures into a lens hydration tray 27 structure in accordance with the pattern generated by lens inspection station for a subsequent hydration process; a hydration station 30 including a hydration tower 35 enabling the expedient hydration of cured lens blanks in their hydration trays; an intelligent puck transfer assembly 50 for indexing and registering, in accordance with the pattern generated by the lens inspection process, a series of individual transport structures 52 referred to herein as "pucks" each puck carrying a single lens package capable of receiving an individual lens product; and a lens unload station 55 where a lens transfer assembly is actuated to transfer only those hydrated lens known to be present in the hydration tray from the communicated bit pattern, from the hydration tray to an individual package puck registered in accordance with the received pattern. As will be explained in greater detail, the expedited and intelligent lens product handling and conveyance is enabled under the programmed control and supervision of an enhanced programmable logic control system (PLC) or like equivalent control device 99 which includes a database comprising data records for tracking the locations of all possible lens fabrication transport structures and identifications.

By way of background, production of the contact lens itself is briefly explained in the context of production control by way of example in above-mentioned U.S. Pat. No. 5,555,504, assigned to the same assignee as the instant invention. As described therein, arrays of ophthalmic contact lenses formed in mold assemblies are first cured in a curing assembly and subject to a de-mold process whereby a back curve mold is removed from a front curve mold while leaving the lens situated in the front curve mold cavity (not shown). In one embodiment, the lens front curve molds with formed lenses therein are carried by lens fabrication structures such as trays or "pallets" 12 configured to transport an array of molds, e.g., a 2×4 array of lenses, for conveyance throughout the system. Alternately, the transport structure may itself comprise an integrated array of front curve mold structures.

Figure 2A:
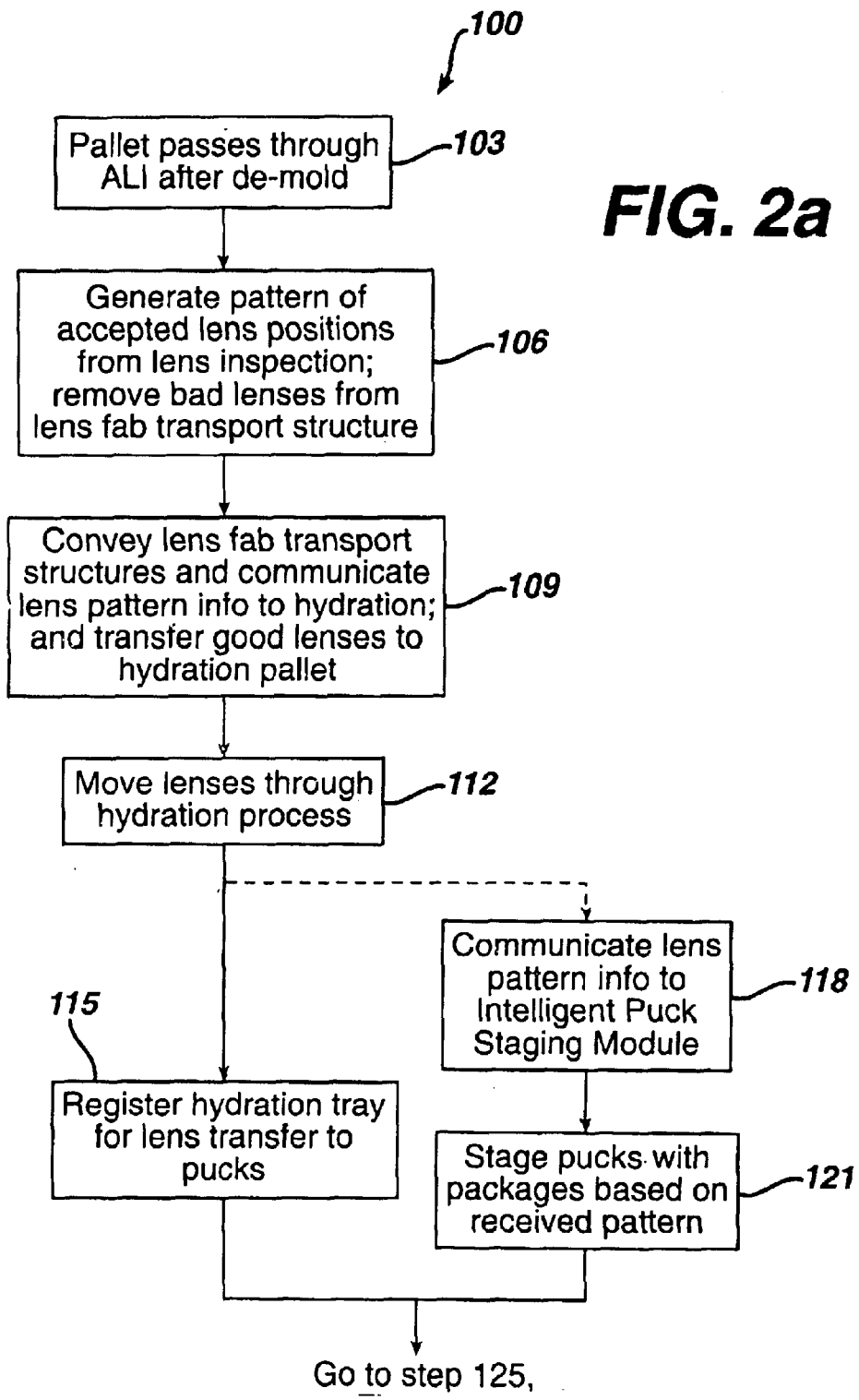

FIGS. 2(a)–2(b) comprise a flow diagram depicting the process 100 for enabling intelligent lens transfer and conveyance in the lens handling system of FIG. 1. As now explained in the flow chart of FIG. 2(a), at step 103, the process begins by conveying the lens transport structure 12 which, for illustrative purposes, comprises a 2×4 pallet carrying an array lens mold structures and cured lens blanks therein, from a de-mold process (not shown) to the Automatic Lens Inspection station 15 where the lenses are coarsely analyzed in their front curve mold structure for defects such as rips or tears, darkspots, bubbles, impurities, and the like, according to conventional processes. One such inspection method is described in commonly-owned, co-pending U.S. patent application Ser. No. 09/751,875 now U.S. Pat. No. 6,577,387, filed Dec. 29, 2000 and entitled INSPECTION OF OPHTHALMIC LENSES USING ABSORPTION, the whole contents and disclosure of which is incorporated by reference as if fully set forth herein. Next, at step 106, as a result of ALI processing, inspection data comprising the pass/fail status of individual cavities on the pallet is generated for inclusion in a data record associated with each pallet for tracking and control purposes. The pass/fail status of respective accepted/rejected lenses resulting from the lens inspection is represented as a bit pattern, as will be explained in greater detail.

More specifically, according to the invention, as depicted in FIG. 1, each lens transport structure conveyed in the system has an associated electronic data record 13 that is communicated between the software control mechanisms of the PLC control system 99 at each successive material handling station as lens processing for that lens transport structure proceeds at the respective stations. Preferably, the electronic data record 13 associated with the lens transport structure that is conveyed in the system includes information for identification and tracking including, but not limited to: a unique identifier for the lens transport structure (e.g., pallet) carrying the lens, a lot number, lot size, product code, lens parameter information including power, cylinder, axis and expiration date (as an example for toric lenses), process time, a pallet status code for identifying an empty pallet or one that has passed, and a station code including codes indicating: Passed FC/BC Transfer and Load, Passed Tween Stamp, Passed Filling, Passed Deposition, Passed Pre Cure, Passed Pre Heat and Cure, Passed Demold Pre Heat and Demold, Passed Inspection, Passed FC Transfer and Hydration, Hydration & Lens Transfer, and associated time stamp information at each station, etc. According to the invention, as shown in FIG. 3, the data record further includes the inspection result data, particularly in the form of a binary word representing the pattern of accepted/rejected lenses resulting from the lens inspection. As shown in FIG. 3(a), for each transport structure 12a, 12b, there is depicted a respective byte 17 including 8-bit positions corresponding to each of the lenses in the array, e.g., a 2×4 array for illustrative purposes. Each bit position of the byte 17 will have a bit value generated at the time of lens inspection at the lens inspection station. These values include either of "1", for example, to indicate a good lens present at that lens position, or a bit value of "0", for example, to indicate a rejected lens at that bit position. For example, for lens transport structure 12a, the data conveyed for acceptable lenses at lens positions 1–4 will be "00011110".

Referring back to the flow chart of FIG. 2(a), as further shown at step 106, and in further view of FIG. 1, the lenses indicated as being rejected for that pallet are removed by the lens removal mechanism at the lens removal station 20. Then, at step 109, the transport structures are then conveyed to the lens transfer assembly 25 at the hydration station where the remaining acceptable lenses are to be transferred to a hydration tray 27 registered to receive the transfer of acceptable lenses according to the bit pattern information. Additionally, the lens position information is logically communicated to hydration station via the PLC.

Referring back to FIG. 1, the lens fabrication transport structures or pallets 12 are conveyed serially in the direction indicated by an arrow "A". To increase throughput in the lens fabrication system, the hydration tray 27 may accommodate an increased number of lenses, and for example, may comprise a 2×8 array of lens positions. These hydration trays 27 are indexed along a direction B and registered at a location indicated by a hydration tray 26 in a manner so as to facilitate the transfer of lenses thereto from the transport pallets. That is, under PLC control at the lens transfer assembly 25, as depicted conceptually in FIG. 3(b), lenses from lens positions 0–7 of transport structure 12b are simultaneously picked up and placed in corresponding positions 0–7 in hydration tray 27. Concurrently, lenses from lens positions 0–7 of lens transport structure 12a are simultaneously picked up and placed in corresponding positions 8–15 in hydration tray 27. According to the invention, as shown in FIG. 1, a corresponding data record 23 is logically formed as a result of lens transfer at the station 25 for subsequent conveyance in the system. This data record 23 maintains the two bytes 17 indicating presence of "good" lenses at positions according to the respective bit values indicated from the data records 13 for the lenses conveyed by the corresponding two 2×4 transport structures e.g., 12a, 12b from FIG. 3(a), with the first byte corresponding to positions 0–7 and the second byte corresponding to positions 8–15.

Referring back to the flow chart of FIG. 2(a), as further shown at step 112, the lenses are processed at the hydration station. Further details regarding the hydration process may be found in commonly-owned, co-pending U.S. patent application Ser. No. 09/252,307, now issued as U.S. Pat. No. 6,207,086, filed Feb. 18, 1999 and entitled METHOD AND APPARATUS FOR WASHING OR HYDRATION OF OPHTHALMIC DEVICES, the contents and disclosure of which is incorporated by reference as if fully set forth herein. Generally, referring to the side elevation view of the hydration station 30 depicted in FIG. 4, and in accordance with the embodiment of the invention depicted in FIG. 1, the lens transfer operation at lens transfer station 25 includes a step of precisely operating a servo motor for aligning a mechanized lens transfer head 33 comprising a two lines of eight vacuum suction nozzles 34 each with the lens positions of the corresponding two 2×4 transport structures 12a, 12b, activating a negative pressure manifold for enabling lens pick up at the respective lens locations therefrom, and aligning and transferring the individual lenses to respective positions on the hydration tray 26. After the lenses are loaded into the hydration tray 26 they are conveyed to a location 28 of an elevator mechanism 42 of the hydration tower 35 where the tray is stacked and elevated vertically through the tower through a sequence of steps for receiving for various degrees of deionized water exposure. After hydration processing, as shown in view of FIG. 1, each tray 27 containing hydrated lenses is moved in the direction of arrow "C," where they are lowered from the hydration tower by elevator mechanism 35 at a location 29 and conveyed in the direction of arrow "D" to a position 31 in registration with the lens unload station 55 where the hydrated lenses are to be intelligently transferred from the hydration tray to individual packages contained in the individually registered transport pucks.

Referring back to FIG. 2(a), after hydration step 112 and during the time the hydration tray containing hydrated lenses is lowered from the hydration tower 35 and registered for lens unload at transfer station 55 indicated at step 115, the lens transfer bit pattern included with the electronic data record for that tray hydration 27 at position 31 is communicated to the intelligent puck transfer assembly 50 and lens load station 55 at step 118 so that the position of the good lenses remaining in the tray may be determined. With this information, as indicated at step 121, the intelligent puck transfer assembly 50 is actuated for staging zero or more pucks in the appropriate position for lens transfer from the hydration tray 27.

Figure 4:
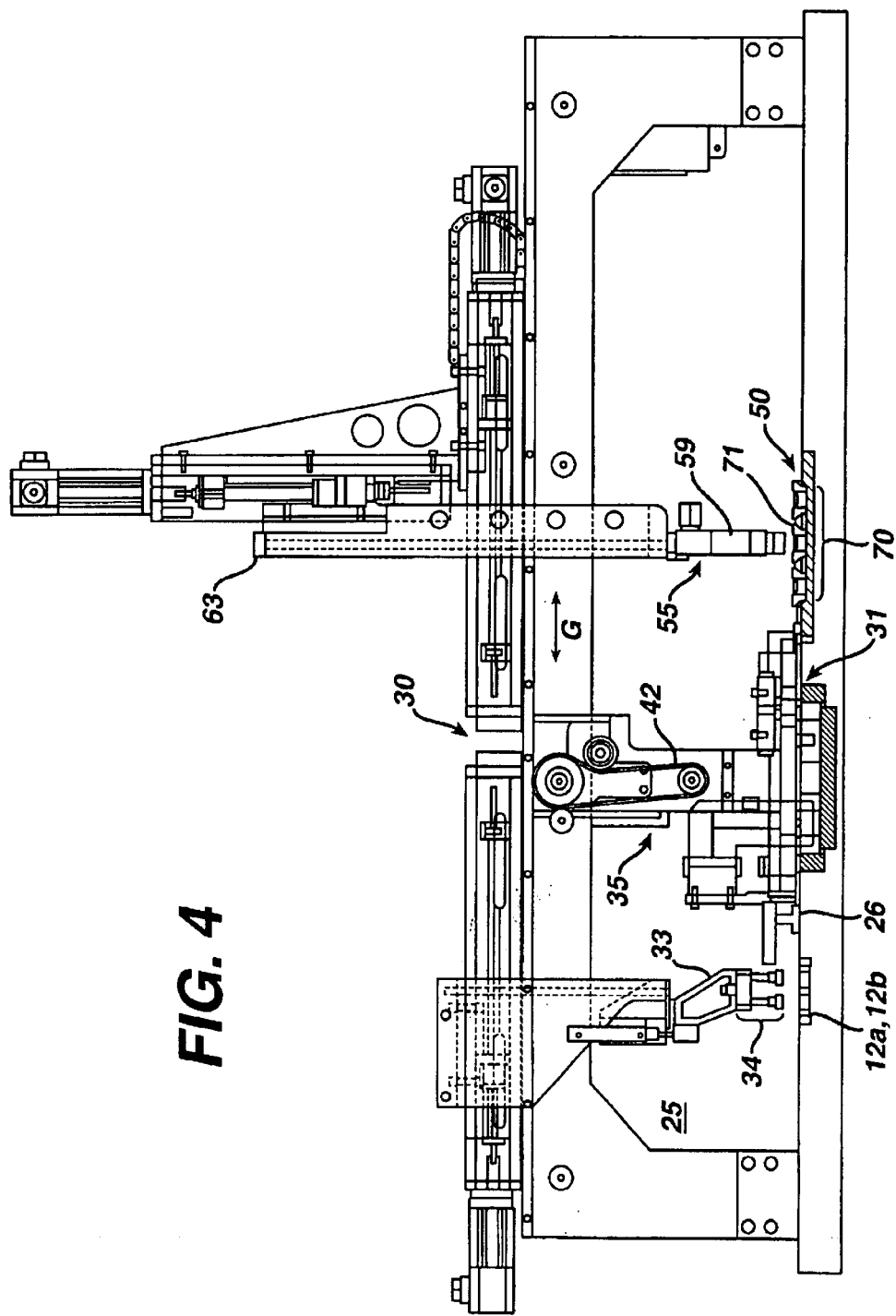
FIG. 4 is a side elevational view of the hydration station for hydrating lenses in the lens production facility; and, FIG. 5 is a detailed top plan view of the lens puck transfer facility for enabling intelligent puck transfer according to the principles of the invention.
Figure 5:
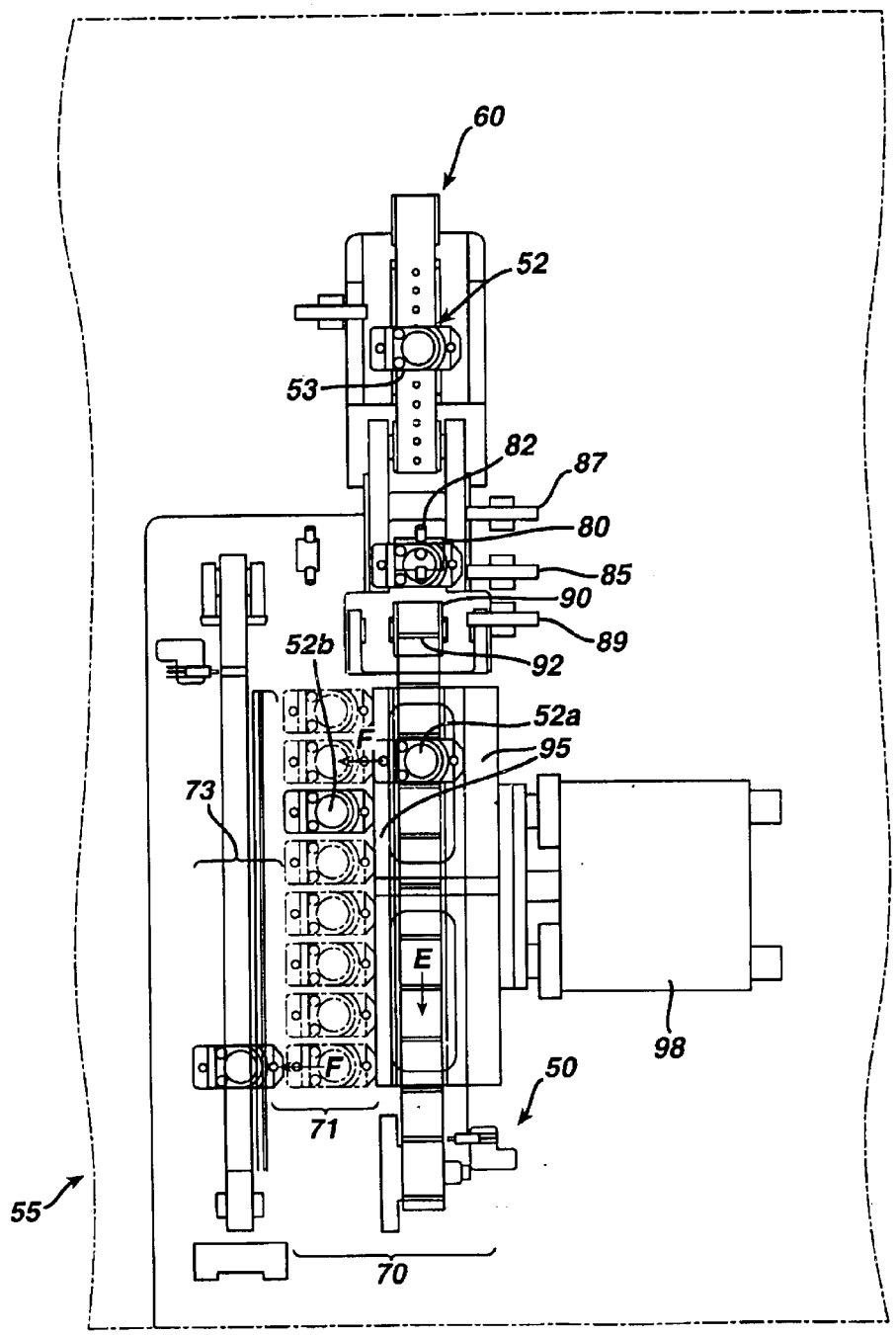

More particularly, in accordance with the intelligent puck staging step 121 of FIG. 2(a), the process for intelligent puck transfer and staging according to the principles of the invention is now described with respect to FIG. 5 which illustrates an example embodiment of the intelligent puck transfer and staging assembly 50 according to the principles of the invention. In operation, as shown in FIG. 5, a conveyor belt or like transport mechanism 60 conveys a series of pucks 52, each comprising a previously loaded lens package 53 for receiving a lens to be loaded from the hydration tray at the lens load station 55. The bit pattern information communicated from the hydration station associated with the hydration tray is utilized to register anywhere between 0 and 8 pucks at a lens load staging area 70 in the manner as follows: First, at the lens load station 55, as shown in FIG. 4, a series of eight lens transfer nozzles 59 are utilized and individually activated to grab only the acceptable lenses from a respective row of the hydration tray 27. Referring back to FIG. 3(*b*), at the hydration station, the tray 27 is organized as a first row 37*a* comprising zero or more good lenses at positions 4–7 and 12–15 and a second row 37*b* comprising lenses at positions 0–3 and 8–11. Utilizing bit shifting and masking techniques as would be within the purview of skilled artisans, the bit positions of the two bytes of information 17 maintained for that tray are communicated to the puck registration assembly 50 to enable the staging of individual pucks 52 for a subsequent lens transfer operation. According to an example embodiment, transfer of good lenses from the hydration tray is successively performed on a row-by-row basis such that, as shown in FIG. 3(*b*), good lenses at positions indicated in row 37*a* are first transferred and then good lenses at positions indicated in row 37*b* are transferred. Thus, when transferring the good lenses at positions 4–7 and 12–15 of row 37*a* of the hydration tray, the bit position values of the known good lenses are mapped into a new 8-bit byte 57 at the puck transfer assembly as shown in FIG. 3(*c*). Any of the 8-bit positions of puck staging byte 57 having a "1" are used by the puck transfer assembly 50 to enable registration of a puck 52 carrying an individual package into a corresponding position along the conveyor 90 of the lens load staging area 70. More specifically, as shown in the intelligent puck transfer assembly 50 of FIG. 5, a servo-operated pin-wheel mechanism 80 comprising individual lugs 82 and a lug belt 90 comprising lugs 92 operating for indexed motion in a direction indicated by arrow "E" in conjunction with the pinwheel 80 cooperatively operate to stage zero or more pucks according to the pattern for the bit positions of each consecutive row 37*a*, 37*b*. Thus, for example, if no lens is present at a position in the row 37*a*, i.e., the bit pattern in byte 57 indicates a "0" at that row position, and the pinwheel and lug belt 90 will index forward without a puck release. However, if a lens is present at a position in the row 37*a*, i.e., the bit pattern indicates a "1" at a row position, a puck is loaded to the pinwheel, engaged by the lug 82 of the pinwheel, and released by the pinwheel for registered movement along the lug belt 90. It is thus understood that the lug belt 90 may receive up to 8 pucks at a time for staging according to the row bit pattern from hydration. As shown in FIG. 5, a puck 52*a* is shown released to the belt 90 in a position followed by two empty positions, indicating no lenses at the corresponding position in the hydration tray.

Preferably, a series of sensors is utilized by the control system to ensure registered movement in accordance with the bit pattern associated with lenses to be loaded from the hydration tray. For instance, a first sensor 85 is provided for ensuring that a puck is present at the pinwheel 80, a second sensor 87 is provided to ensure presence of a next puck so that the continuous indexing may be assured, and a third sensor 89 is provided to ensure that the puck has actually been released and engaged by a lug 92 for movement along the belt 90. At the end of the cycle, i.e., after a byte corresponding to a hydration tray row has been processed, along conveyor 90 will be staged anywhere from zero to eight pucks in accordance with the 8-bit pattern of good lenses to be from transferred for a row from the hydration tray. After processing the eight bit pattern from hydration, these staged pucks are then pushed at once to a lens load position 71 formed as a row in the lens load station 55. Particularly, a rake mechanism 95 under programmed control of an air cylinder 98 is activated to engage the lenses from the lug belt 90 and advance the lens pucks in their respective positions, in a direction indicated by an arrow "F" to the lens load position 71. As shown in FIG. 5, for example, in an immediate prior cycle for a hydration tray row, only one puck 52*b* has been transferred to a corresponding lens load position 71 by the rake assembly 95. It is understood that this position corresponds to a third nozzle position indicating possibly that the bit pattern for the prior hydration tray row transferred was "00000100".

Returning to FIG. 2(*b*), step 125 indicates the step of pushing the staged pucks to the load lens position 71 as described with respect to FIG. 5. It should be understood that, after the staged pucks are pushed to the load lens position 71, as indicated at step 128, the puck staging sequence for the next row of lenses, e.g., row 37*b* in FIG. 3(*b*), in the hydration tray is initiated. In one embodiment, as indicated at step 131, FIG. 2(*b*), while the puck staging sequence for the next row of lenses is performed, the lenses from the hydration tray corresponding to the row of pucks currently staged according to the transferred bit pattern for that row are picked and readied for transfer.

Returning to FIG. 4, a lens transfer assembly 63 including eight in-line suction nozzle assembly 59 is extended, under servo-motor control, to the lens transfer position 31 at the hydration station 30 to pick up the lenses from the row of the hydration tray 37. Thereafter, the lens transfer assembly 63 is retracted back to the lens transfer station 55 to register each lens transfer nozzle carrying a lens with a corresponding puck staged at the load position 71 according to the bit pattern for that row. Extended and retracted movement of the lens transfer assembly 63 including nozzle assembly 59 is shown indicated by the direction of arrow "G". Once the pucks are staged at this lens load position, referring to FIG. 4, the lens transfer nozzles 59 are actuated to physically transfer the lens to the corresponding staged puck in row 71. For the example embodiment shown in FIG. 5, only one lens transfer will take place to the puck 52*b* located in load position 71. The step of physically transferring the hydrated lenses to the respective packages in the staged pucks is indicated at step 134, FIG. 2(*b*)."A detailed explanation regarding the lens transter mechanism may be found in commonly-owned, co-pending U.S. patent application Ser. No. 09/252,207 filed Feb. 18, 1999 and entitled CONTACT LENS TRANSFER AND MATERIAL REMOVAL SYSTEM (VTN-0418), the whole contents and disclosure of which is incorporated by reference as if fully set forth herein." has been replaced by—A detailed explanation regarding the lens transfer mechanism may be found in commonly-owned, co-pending U.S. patent application Ser. No. 09/252,287, now issued as U.S. Pat. No. 6,351,069, filed Feb. 18, 1999 and entitled CONTACT LENS TRANSFER AND MATERIAL REMOVAL SYSTEM, the whole contents and disclosure of which is incorporated by reference as if fully set forth herein.

As further shown in FIG. 2(*b*) at step 138, the pucks having lens transferred thereto are pushed to an exit conveyor belt for subsequent processing at the next contact lens fabrication station, e.g., a lens detect station. That is, referring back to FIG. 5, once the lenses have been loaded into a corresponding staged puck in lens transfer row 71, the puck including package and loaded lens is pushed by rake mechanism 95 in the direction indicated by an arrow "F" to an exit conveyor mechanism 73 for carrying the pucks 52 including a lens package and a transferred hydrated lens. Preferably, the rake mechanism 95 is a dual-push assembly enabling simultaneous pushing of lenses staged by the lug belt 90 to the corresponding lens load position 71 while pushing pucks having packages loaded with lenses at the lens load station 71 to the exit conveyor 73. For exemplary purposes, FIG. 5 shows a lens containing lens package carried by puck 52c having been pushed by rake 95 at a position for a previous hydration tray row. It is understood that the position of prior loaded package 52c corresponds to a first position indicating possibly that the bit pattern for the prior hydration tray row transferred was "00000001".

In a further step, as indicated in FIG. 3(c), the PLC logically tracks the pucks that have been transferred to the exit conveyor belt 73. Particularly, the plurality of pucks that have been transferred for subsequent processing according to the lens bit positions are tracked according to a 16 bit word 47 corresponding to the two rows of the hydration tray. Thus, as shown in FIG. 3(c), the byte pattern corresponding to row 37a of the tray is mapped into bit positions 0–8 of the 16-bit word 47 while the byte pattern corresponding to row 37b of the tray is mapped into bit positions 8–15 of the 16-bit word 47. In this manner, the 16 bit word is used to track the lens parameter, lot, status and other processing information for downstream lens fabrication processing/packaging.

It should be understood that the intelligent lens transfer process as described with respect to FIGS. 2(a)–2(b) is a repetitive process, with processing of successive lens fabrications pallets and rows of hydration trays in the manner described herein. It should be understood, that the intelligent lens transfer scheme as described herein is performed even when lot changes are seamlessly effected in the manner described in commonly-owned, co-pending U.S. patent application Ser. No. 09/305,885 now U.S. Pat. No. 6,609,041 filed May 5, 1999 METHOD AND SYSTEM FOR SKU TRACKING A CHANGEOVER.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims. For example, the concept of intelligent lens transfer according to the principles of the invention described herein may be used elsewhere for different applications. For example, if used elsewhere in the lens fabrication line, pucks do not necessarily have to be carrying packages, i.e., intelligent lens transfer could take place into hydration, if the hydration tray were comprised of individual "pucks" or some other individual carriers. Further, intelligent lens transfer may be at the back end after an inspection step, and not necessarily from a hydration tray to individual pallets for further processing, e.g., for operations such as applying a lens coating step or a step to add pigmentation to a lens, etc.

Having thus described my invention, what I claim as new, and desire to secure by Letters Patent is:

1. A method for automatically transporting a plurality of products for sequential processing at one or more processing stations, one processing station comprising a mechanism for determining acceptability of individual products of said plurality of products conveyed thereto on one or more first transport structures, said method comprising:

a) generating an information record associated with each first transport structure carrying a plurality of products, said record including information for identifying products carried by said first transport structure and including a data structure identifying locations of any product on said transport structure determined to have met acceptability criteria as determined at said one processing station;

b) conveying said first transport structure carrying zero or more acceptable products in sequence to one or more downstream processing stations, and while at each processing station accessing each information record and updating said associated information with status of products as a result of processing thereat;

c) communicating an updated information record associated with a first transport structure currently en route to a product unload area to a transport staging means for staging a plurality of individual transport structures each capable of receiving an individual product to be transferred from said first transport structure, said staging means responsive to said data structure for aligning a plurality of individual transport structures in a staging area according to locations identified in said data structure as including acceptable products; and, d) transferring zero or more acceptable products from identified locations in said first transport structure at said product unload area to said staging area and placing a corresponding individual product to an associated aligned individual transport structure, wherein said updated information record associated with a first transport structure currently en route to a product unload area is communicated prior to arrival of said first transport structure thereat.

2. The method as claimed in claim 1, wherein one of said processing stations is capable of processing acceptable products from one or more transport structures conveyed thereto, said method further comprising the steps of:

transferring identified acceptable products from one or more first transport structures to a second transport structure for simultaneously processing at said one of said processing stations; and, generating a further information record associated with said second transport structure at said processing station, including updating said data structure to identify known locations of zero or more acceptable products on said second transport structure, whereby said step c) includes communicating an updated information record associated with a second transport structure currently en route to said transport staging area for staging a plurality of individual transport structures each capable of receiving an individual product to be transferred from said second transport structure and, step d) includes transferring zero or more acceptable products from identified locations in said second transport structure and placing a corresponding individual product to an associated aligned individual transport structure.

3. The method as claimed in claim 1, wherein said data structure comprises a bit pattern including a pre-defined number of bits, each bit associated with a particular location on said transport structure and having a first value indicating location of acceptable product or, a second value indicating absence of an acceptable product.

4. The method as claimed in claim 1, wherein prior to transferring step b), the step of removing zero or more products from said first transport structure identified at said inspection station as failing to meet said acceptable criteria in accordance with said data structure.

5. The method as claimed in claim 2, wherein said product is an ophthalmic lens, said first transport structures for transferring formed lens products comprising a fabrication tray.

6. The method as claimed in claim 2, wherein said step of transferring identified acceptable products from one or more first transport structures to a second transport structure includes mapping the location of each zero or more acceptable product locations transferred from each respective one or more transport structures providing product to the second transport structure into said data structure.

7. The method as claimed in claim 6, wherein said step b) of transferring one or more pluralities of products from said one or more transport structures to a second transport structure includes buffering a plurality of first transport structures at a buffer location prior to said transfer.

8. The method as claimed in claim 5, wherein said product is an ophthalmic lens, said second transport structure comprising a hydration tray means for carrying acceptable lens products from one or more first transport structures to a hydration station for simultaneously hydrating said formed lenses.

9. The method as claimed in claim 3, wherein said step of staging a plurality of individual transport structures each capable of receiving an individual product to be transferred from said first transport structure comprises the steps of:
   feeding a plurality of individual transport structures to a first location via a first conveyor in accordance with said received bit pattern;
   transporting zero or more individual transport structures to said staging area via a second conveyor in accordance with a received bit pattern;
   one of engaging an individual transport structure in response to detection of a first bit value from said bit pattern, or preventing engagement of an individual transport structure in response to detection of a second bit value from said bit pattern; and respectively in response,
   handing-off an engaged individual transport structure to a second conveyor for indexed conveyance to said staging area in accordance with a first bit value of said bit pattern or is prevented from handing-off said individual transport structure to said second conveyor in accordance with a second bit value of said bit pattern; and,
   enabling indexed movement of said second conveyor in accordance with an amount of said pre-defined number of bits in said bit pattern, whereby handed-off individual transport structures are conveyed to said staging area and registered at locations corresponding to received first bit values of said pre-defined number of bits.

10. The method as claimed in claim 9, wherein said staging area includes a product load position where said acceptable products are simultaneously transferred thereto from a product unload location, said method further comprising the step of simultaneously pushing said individual transport structures to said product load position after registered in accordance with said bit pattern.

11. A system for automatically transporting a plurality of ophthalmic lens for sequential processing at one or more processing stations, one processing station comprising a mechanism for determining acceptability of individual products of said plurality of products conveyed thereto on one or more first transport structures and generating an information record associated with each first transport structure including information for identifying products carried by said first transport structure and including a data structure identifying locations of any product on said first transport structure determined to have met acceptability criteria as determined at said one processing station, said system comprising:
   communications infrastructure for enabling access to said information records at each downstream processing station in coordination with processing of products carried by its associated first transport structure at a respective processing station;
   a transport staging means for staging a plurality of individual transport structures each capable of receiving an individual product to be transferred from said first transport structure in response to a received information record associated with a first transport structure currently en route to a product unload area, said staging means including means for aligning zero or more individual transport structures in a staging area according to locations identified in said data structure as including acceptable products; and,
   a first transfer mechanism including transfer elements for transferring zero or more acceptable products from said first transport structure to respective individual aligned transport structures in said staging area; and,
   control means responsive to receipt of said information records associated with one or more first transport structures for coordinating activation of said transfer elements at locations of acceptable products to be transferred by said first transfer mechanism as indicated by said data structure, and initiating simultaneous transfer and placement of individual products to a respective aligned transport structure, wherein said information record associated with a first transport structure currently en route to a product unload area is communicated prior to arrival of said first transport structure thereat.

12. The system for automatically transporting products as claimed in claim 11, wherein one of said processing stations is capable of processing acceptable products from one or more first transport structures conveyed thereto, said system further comprising:
   second transfer mechanism for transferring identified acceptable products from one or more first transport structures to a second transport structure for simultaneously processing at said one of said processing stations, said control means responsive to receipt of said information records associated with each respective one or more first transport structures for coordinating activation of said transfer elements at locations of acceptable products to be transferred by said second transfer mechanism as indicated by respective data structures for each first transport structure.

13. The system for automatically transporting products as claimed in claim 12, further comprising:
   means for generating a further information record associated with said second transport structure at said one of said processing stations, said record including an updated data structure to identify known locations of zero or more acceptable lenses on said second transport structure,
   whereby said communications infrastructure enables communication of an updated information record associated with a second transport structure currently en route to said transport staging area for staging a plurality of individual transport structures each capable of receiving an individual product to be transferred from said second transport structure.

14. The system for automatically transporting products as claimed in claim 11, wherein said data structure comprises a bit pattern including a pre-defined number of bits, each bit associated with a particular location on said transport structure and having a first value indicating location of acceptable product or, a second value indicating absence of an acceptable product.

15. The system for automatically transporting products as claimed in claim 11, further including a mechanism for removing zero or more products from said first transport structure identified as failing to meet said acceptable criteria in accordance with said data structure.

16. The system for automatically transporting products as claimed in claim 12, wherein said product is an ophthalmic lens, said first transport structures for transporting formed lens products comprising a fabrication tray.

17. The system for automatically transporting products as claimed in claim 16, wherein said product is an ophthalmic lens, said second transport structure comprising a hydration tray means for carrying acceptable lens products from one or more first transport structures to a hydration station for hydrating said formed lenses.

18. The system for automatically transporting products as claimed in claim 13, wherein said means for generating a further information record associated with said second transport structure at said one of said processing stations includes mechanism for mapping the location of each zero or more acceptable product locations transferred from each respective one or more transport structures providing product to the second transport structure into said data structure.

19. The system for automatically transporting products as claimed in claim 14, wherein said staging mechanism includes:
   a first conveyor mechanism for feeding a plurality of individual transport structures to a first location in accordance with said received bit pattern;
   a second conveyor mechanism for transporting zero or more individual transport structures to said staging area in accordance with a received bit pattern;
   device located at said first location for engaging an individual transport structure in response to detection of a first bit value from said bit pattern, or preventing engagement of an individual transport structure in response to detection of a second bit value from said bit pattern, said device either handing-off an engaged individual transport structure to said second conveyor for indexed conveyance to said staging area in accordance with a first bit value of said bit pattern or is prevented from handing-off said individual transport structure to said second conveyor in accordance with a second bit value of said bit pattern;
   said control means enabling indexed movement of said second conveyor in accordance with an amount of said pre-defined number of bits in said bit pattern, whereby handed-off individual transport structures are conveyed to said staging area at a location corresponding to received first bit values of said pre-defined number of bits.

20. The system for automatically transporting products as claimed in claim 19, wherein said staging area includes a product load position where said acceptable products are simultaneously transferred thereto by said first transfer mechanism, said staging mechanism further comprising pusher mechanism for pushing said individual transport structures to said product load position according to said bit pattern.

21. The system for automatically transporting products as claimed in claim 20, further comprising an exit conveyor for transporting said individual transport structures including a product transferred thereto, said pusher mechanism simultaneously pushing each said individual transport structure including a product from said product load position to said exit conveyor.

22. A method for automatically transporting a plurality of ophthalmic lenses for sequential processing at one or more processing stations, one processing station comprising a mechanism for determining locations of acceptable lenses to be transported for further downstream processing on one or more first transport structures, said method comprising:
   a) generating an information record associated with each first transport structure carrying a plurality of lenses, said record including information for identifying the lenses carried by said first transport structure and including a data structure identifying said locations of any acceptable lens carried on said first transport structure as determined at said processing station;
   b) conveying said first transport structure carrying zero or more acceptable lenses in sequence to one or more downstream processing stations, and while at each processing station accessing each information record and updating said associated information with status of lenses as a result of processing at said station;
   c) communicating an updated information record associated with a first transport structure currently en route to a lens unload area to a transport staging means for staging a plurality of individual transport structures each capable of receiving an individual lens to be transferred from said first transport structure, said staging means responsive to said data structure for aligning a plurality of individual transport structures in a staging area according to locations identified in said data structure as including an acceptable lens; and,
   d) transferring zero or more acceptable lenses from identified locations in said transport structure at said lens unload area to said staging area and placing a corresponding individual lens to an associated aligned individual transport structure, wherein said updated information record associated with a first transport structure currently en route to said lens unload area is communicated prior to arrival of said first transport structure thereat.

23. The method for automatically transporting a plurality of ophthalmic lenses as claimed in claim 22, wherein one of said processing stations is capable of processing acceptable lenses from one or more transport structures conveyed thereto, said method further comprising the steps of:
   transferring identified acceptable lenses from one or more first transport structures to a second transport structure for simultaneously processing at said one of said processing stations; and,
   generating a further information record associated with said second transport structure at said processing station, including updating said data structure to identify known locations of zero or more acceptable lenses on said second transport structure,
   whereby said step c) includes communicating an updated information record associated with a second transport structure currently en route to said transport staging area for staging a plurality of individual transport structures each capable of receiving an individual lens to be transferred from said second transport structure and,
   step d) includes transferring zero or more acceptable lenses from identified locations in said second transport structure and placing a corresponding individual lens to an associated aligned individual transport structure.

24. The method for automatically transporting a plurality of ophthalmic lenses as claimed in claim 22, wherein said data structure comprises a bit pattern including a pre-defined number of bits, each bit associated with a particular location on said first transport structure and having a first value indicating location of an acceptable lens or, a second value indicating absence of an acceptable lens.

25. The method for automatically transporting a plurality of ophthalmic lenses as claimed in claim 22, wherein prior to transferring step b), the step of removing zero or more lenses from said first transport structure identified as failing to meet said acceptable criteria in accordance with said data structure.

26. The method for automatically transporting a plurality of ophthalmic lenses as claimed in claim 23, wherein said first transport structure comprises a fabrication tray having lens products formed therein.

27. The method for automatically transporting a plurality of ophthalmic lenses as claimed in claim 23, wherein said step of transferring identified acceptable lenses from one or more first transport structures to a second transport structure includes mapping the location of each zero or more acceptable lens locations transferred from each respective one or more transport structures providing lenses to the second transport structure into said data structure.

28. The method for automatically transporting a plurality of ophthalmic lenses as claimed in claim 27, wherein said step b) of transferring one or more pluralities of lenses from said one or more transport structures to a second transport structure includes buffering a plurality of first transport structures at a buffer location prior to said transfer.

29. The method for automatically transporting a plurality of ophthalmic lenses as claimed in claim 26, wherein said second transport structure comprises a hydration tray means for carrying acceptable lens products from said one or more first transport structures to a hydration station for simultaneously hydrating said formed lenses.

30. The method for automatically transporting a plurality of ophthalmic lenses as claimed in claim 24, wherein said step of staging a plurality of individual transport structures each capable of receiving an individual lens to be transferred from said first transport structure comprises the steps of:

feeding a plurality of individual transport structures to a first location via a first conveyor in accordance with said received bit pattern;

transporting zero or more individual transport structures to said staging area via a second conveyor in accordance with a received bit pattern;

one of engaging an individual transport structure in response to detection of a first bit value from said bit pattern, or preventing engagement of an individual transport structure in response to detection of a second bit value from said bit pattern; and respectively in response, handing-off an engaged individual transport structure to a second conveyor for indexed conveyance to said staging area in accordance with a first bit value of said bit pattern or is prevented from handing-off said individual transport structure to said second conveyor in accordance with a second bit value of said bit pattern; and, enabling indexed movement of said second conveyor in accordance with an amount of said pre-defined number of bits in said bit pattern, whereby handed-off individual transport structures are conveyed to said staging area and registered at locations corresponding to received first bit values of said pre-defined number of bits.

31. The method for automatically transporting a plurality of ophthalmic lenses as claimed in claim 30, wherein said staging area includes a lens load position where said acceptable products are simultaneously transferred thereto from a lens unload position, said method further comprising the step of simultaneously pushing said individual transport structures to said lens load position after registered in accordance with said bit pattern.

32. A system for automatically transporting a plurality of ophthalmic lens for sequential processing at one or more processing stations, one processing station comprising a mechanism for determining locations of acceptable lenses to be transported for further downstream processing on one or more first transport structures, and generating an information record associated with each first transport structure for identifying products carried by said first transport structure, said record including a data structure identifying said locations of any acceptable lens carried on said first transport structure, said system comprising:

communications infrastructure for enabling access to said information records at each downstream processing station in coordination with processing of lenses carried by its associated first transport structure at a respective processing station;

a transport staging means for staging a plurality of individual transport structures each capable of receiving an individual lens to be transferred from said first transport structure in response to a received information record associated with a first transport structure currently en route to a lens unload area, said staging means including means for aligning zero or more individual transport structures in a staging area according to locations identified in said data structure as including acceptable lenses;

a first transfer mechanism including transfer elements for transferring zero or more acceptable lenses from said first transport structure to respective individual aligned transport structures in said staging area; and, control means responsive to receipt of said information records associated with one or more first transport structures for coordinating activation of said transfer elements at locations of acceptable lenses to be transferred by said first transfer mechanism as indicated by said data structure, and initiating simultaneous transfer and placement of individual lenses to a respective aligned transport structure, wherein said information record associated with a first transport structure currently en route to a lens unload area is communicated prior to arrival of said first transport structure thereat.

33. The system for automatically transporting ophthalmic lenses as claimed in claim 32, wherein one of said processing stations is capable of processing acceptable lenses from one or more first transport structures conveyed thereto, said system further comprising:

second transfer mechanism for transferring identified acceptable lenses from one or more first transport structures to a second transport structure for simultaneously processing at said one of said processing stations, said control means responsive to receipt of said information records associated with each respective one or more first transport structures for coordinating activation of said transfer elements at locations of acceptable lenses to be transferred by said second transfer mechanism as indicated by respective data structures for each first transport structure.

34. The system for automatically transporting ophthalmic lenses as claimed in claim 33, further comprising:

means for generating a further information record associated with said second transport structure at said one of said processing stations, said record including an updated data structure to identify known locations of zero or more acceptable lenses on said second transport structure, whereby said communications infrastructure enables communication of an updated information record associated with a second transport structure currently en route to said transport staging area for staging a plurality of individual transport structures each capable of receiving an individual lens to be transferred from said second transport structure.

35. The system for automatically transporting ophthalmic lenses as claimed in claim 32, wherein said data structure comprises a bit pattern including a pre-defined number of bits, each bit associated with a particular location on said transport structure and having a first value indicating location of acceptable lens or, a second value indicating absence of an acceptable lens.

36. The system for automatically transporting ophthalmic lenses as claimed in claim 32, further including a mechanism for removing zero or more lenses from said first transport structure identified as failing to meet acceptable criteria in accordance with said determining mechanism.

37. The system for automatically transporting ophthalmic lenses as claimed in claim 33, wherein said first transport structures includes a fabrication tray having lens products formed therein.

38. The system for automatically transporting ophthalmic lenses as claimed in claim 37, wherein said second transport structure comprising a hydration tray means for carrying acceptable lenses from one or more first transport structures to a hydration station for hydrating said formed lenses.

39. The system for automatically transporting ophthalmic lenses as claimed in claim 34, wherein said means for generating a further information record associated with said second transport structure at said one of said processing stations includes mechanism for mapping the location of each zero or more acceptable lens locations transferred from each respective one or more transport structures providing product to the second transport structure into said data structure.

40. The system for automatically transporting ophthalmic lenses as claimed in claim 35, wherein said staging mechanism includes:

a first conveyor mechanism for feeding a plurality of individual transport structures to a first location in accordance with said received bit pattern;

a second conveyor mechanism for transporting zero or more individual transport structures to said staging area in accordance with a received bit pattern;

device located at said first location for engaging an individual transport structure in response to detection of a first bit value from said bit pattern, or preventing engagement of an individual transport structure in response to detection of a second bit value from said bit pattern, said device either handing-off an engaged individual transport structure to said second conveyor for indexed conveyance to said staging area in accordance with a first bit value of said bit pattern or is prevented from handing-off said individual transport structure to said second conveyor in accordance with a second bit value of said bit pattern;

said control means enabling indexed movement of said second conveyor in accordance with an amount of said pre-defined number of bits in said bit pattern, whereby handed-off individual transport structures are conveyed to said staging area at a location corresponding to received first bit values of said pre-defined number of bits.

41. The system for automatically transporting ophthalmic lenses as claimed in claim 40, wherein said staging area includes a product load position where said acceptable lenses are simultaneously transferred thereto by said first transfer mechanism, said staging mechanism further comprising pusher mechanism for pushing said individual transport structures to said product load position according to said bit pattern.

42. The system for automatically transporting ophthalmic lenses as claimed in claim 41, further comprising an exit conveyor for transporting said individual transport structures including a lens transferred thereto, said pusher mechanism simultaneously pushing each said individual transport structure including said lens from said lens load position to said exit conveyor.

43. A program storage device readable by a machine, tangibly embodying a program of instructions executable by the machine to perform method steps for automatically transporting a plurality of products for sequential processing at one or more processing stations, one processing station comprising a mechanism for determining acceptability of individual products of said plurality of products conveyed thereto on one or more first transport structures, said method steps comprising:

a) generating an information record associated with each first transport structure carrying a plurality of products, said record including information for identifying products carried by said first transport structure and including a data structure identifying locations of any product on said transport structure determined to have met acceptability criteria as determined at said one processing station;

b) conveying said first transport structure carrying zero or more acceptable products in sequence to one or more downstream processing stations, and while at each processing station accessing each information record and updating said associated information with status of products as a result of processing thereat;

c) communicating an updated information record associated with a first transport structure currently en route to a product unload area to a transport staging means for staging a plurality of individual transport structures each capable of receiving an individual product to be transferred from said first transport structure, said staging means responsive to said data structure for aligning a plurality of individual transport structures in a staging area according to locations identified in said data structure as including acceptable products; and, d) transferring zero or more acceptable products from identified locations in said first transport structure at said product unload area to said staging area and placing a corresponding individual product to an associated aligned individual transport structure, wherein said updated information record associated with a first transport structure currently en route to a product unload area is communicated prior to arrival of said first transport structure thereat.

44. The program storage device readable by a machine as claimed in claim 43, wherein one of said processing stations is capable of processing acceptable products from one or more transport structures conveyed thereto, said method further comprising the steps of:

transferring identified acceptable products from one or more first transport structures to a second transport structure for simultaneously processing at said one of said processing stations; and, generating a further information record associated with said second transport structure at said processing station, including updating said data structure to identify known locations of zero or more acceptable products on said second transport structure, whereby said step c) includes communicating an updated information record associated with a second transport structure currently en route to said transport staging area for staging a plurality of individual transport structures each capable of receiving an individual product to be transferred from said second transport structure and, step d) includes transferring zero or more acceptable products from identified locations in said second transport structure and placing a corresponding individual product to an associated aligned individual transport structure.

45. The program storage device readable by a machine as claimed in claim 43, wherein said data structure comprises a bit pattern including a pre-defined number of bits, each bit associated with a particular location on said transport structure and having a first value indicating location of acceptable product or, a second value indicating absence of an acceptable product.

46. The program storage device readable by a machine as claimed in claim 43, wherein prior to transferring step b), the step of removing zero or more products from said first transport structure identified at said inspection station as failing to meet said acceptable criteria in accordance with said data structure.

47. The program storage device readable by a machine as claimed in claim 44, wherein said product is an ophthalmic lens, said first transport structures for transferring formed lens products comprising a fabrication tray.

48. The program storage device readable by a machine as claimed in claim 44, wherein said step of transferring identified acceptable products from one or more first transport structures to a second transport structure includes mapping the location of each zero or more acceptable product locations transferred from each respective one or more transport structures providing product to the second transport structure into said data structure.

49. The program storage device readable by a machine as claimed in claim 48, wherein said step b) of transferring one or more pluralities of products from said one or more transport structures to a second transport structure includes buffering a plurality of first transport structures at a buffer location prior to said transfer.

50. The program storage device readable by a machine as claimed in claim 47, wherein said product is an ophthalmic lens, said second transport structure comprising a hydration tray means for carrying acceptable lens products from one or more first transport structures to a hydration station for simultaneously hydrating said formed lenses.

51. The program storage device readable by a machine as claimed in claim 45, wherein said step of staging a plurality of individual transport structures each capable of receiving an individual product to be transferred from said first transport structure comprises the steps of:

feeding a plurality of individual transport structures to a first location via a first conveyor in accordance with said received bit pattern;

transporting zero or more individual transport structures to said staging area via a second conveyor in accordance with a received bit pattern;

one of engaging an individual transport structure in response to detection of a first bit value from said bit pattern, or preventing engagement of an individual transport structure in response to detection of a second bit value from said bit pattern; and respectively in response, handing-off an engaged individual transport structure to a second conveyor for indexed conveyance to said staging area in accordance with a first bit value of said bit pattern or is prevented from handing-off said individual transport structure to said second conveyor in accordance with a second bit value of said bit pattern; and, enabling indexed movement of said second conveyor in accordance with an amount of said pre-defined number of bits in said bit pattern, whereby handed-off individual transport structures are conveyed to said staging area and registered at locations corresponding to received first bit values of said pre-defined number of bits.

52. The program storage device readable by a machine as claimed in claim 51, wherein said staging area includes a product load position where said acceptable products are simultaneously transferred thereto from a product unload location, said method steps further comprising the step of simultaneously pushing said individual transport structures to said product load position after registered in accordance with said bit pattern.

* * * * *